United States Patent
Tokuda et al.

(10) Patent No.: US 8,343,431 B2
(45) Date of Patent: Jan. 1, 2013

(54) HONEYCOMB FILTER AND METHOD OF MANUFACTURING THE SAME

(75) Inventors: Shingo Tokuda, Nagoya (JP); Takashi Mizutani, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 320 days.

(21) Appl. No.: 12/719,091

(22) Filed: Mar. 8, 2010

(65) Prior Publication Data

US 2010/0247400 A1    Sep. 30, 2010

(30) Foreign Application Priority Data

Mar. 31, 2009 (JP) ................. 2009-086986

(51) Int. Cl.
*B01D 50/00* (2006.01)
(52) U.S. Cl. ...................................... 422/180
(58) Field of Classification Search .............. 422/177, 422/180; 428/116; 55/523; 438/303
See application file for complete search history.

(56) References Cited

U.S. PATENT DOCUMENTS

| | | | |
|---|---|---|---|
| 4,390,355 A * | 6/1983 | Hammond et al. | ............. 55/523 |
| 5,114,581 A | 5/1992 | Goldsmith et al. | |
| 6,508,852 B1 * | 1/2003 | Hickman et al. | ................. 55/523 |
| 2007/0238256 A1 * | 10/2007 | Fischer et al. | ................. 438/303 |
| 2008/0264010 A1 | 10/2008 | Mizuno et al. | |

FOREIGN PATENT DOCUMENTS

| | | |
|---|---|---|
| DE | 10 2006 040 739 A1 | 3/2008 |
| EP | 1 566 214 A1 | 8/2005 |
| EP | 1 985 352 A2 | 10/2008 |
| JP | 2607898 Y2 | 11/2006 |
| JP | 2008-272664 A1 | 11/2008 |
| WO | 2008/025603 A1 | 3/2008 |

\* cited by examiner

*Primary Examiner* — Tom Duong
(74) *Attorney, Agent, or Firm* — Burr & Brown (57) ABSTRACT

The honeycomb filter is constructed as a diesel particulate filter having a filtration function for filtering out the particulate matter included in an exhaust emission of a diesel engine. The honeycomb filter has a honeycomb structure as a base and inlet opening cells with surface layers formed on respective inner surfaces thereof. The surface layer has zero film thickness in an inlet peripheral region. Separation vortexes are generated in the inlet peripheral regions. The zero film thickness of the surface layers in the inlet peripheral regions naturally causes non-flaking of the surface layers induced by the separation vortexes generated in the inlet peripheral regions and thereby leads to non-production of flakes. In the non-existent condition of flakes, the overall surface layers are not collapsed by collision of the flakes.

5 Claims, 8 Drawing Sheets

HONEYCOMB FILTER AND METHOD OF MANUFACTURING THE SAME

BACKGROUND OF THE INVENTION

1. Field of the Invention

The present invention relates to a honeycomb filter and a method of manufacturing the honeycomb filter.

2. Description of the Related Art

Honeycomb filters are generally known in the art. The honeycomb filter is used to remove particulate matter (PM) from PM-containing exhaust emission discharged from a combustion device, such as an engine, and release the PM-free exhaust emission into the atmosphere. The honeycomb filter is structured to have a large number of cells parted by porous partition walls. The large number of cells include inlet opening cells with open inlets and outlets sealed with outlet sealing members and outlet opening cells with inlets sealed with inlet sealing members and open outlets. The inlet opening cells and the outlet opening cells are arranged alternately to be adjacent to each other. The PM-containing exhaust emission from the combustion device flows via the open inlets of the inlet opening cells included in the honeycomb filter into the respective inlet opening cells, passes through the porous partition walls, flows into the adjoining outlet opening cells adjacent to the respective inlet opening cells, and is released via the open outlets of the outlet opening cells to the atmosphere. The PM is trapped by the porous partition walls, as the PM-containing exhaust emission penetrates from the inlet opening cells through the porous partition walls and flows into the outlet opening cells. The exhaust emission flowing into the outlet opening cells is accordingly the PM-free clean emission.

When a prior art honeycomb filter in an unused condition is newly used to trap the PM, a pressure drop may abruptly rise immediately after a start of the PM trapping action. This may damage and deteriorate the performance of the combustion device. On a start of trapping the PM by the porous partition walls in the unused condition, depth filtration occurs concurrently with surface filtration. In the depth filtration, the PM invading the pores of the porous partition walls is trapped by the inside of the porous partition walls. In the surface filtration, the PM is trapped by the surface of the porous partition walls. After accumulation of the PM on the surface of the porous partition walls, cake filtration occurs. In the case filtration, the PM sedimentary layers have a filter function. In the initial phase of depth filtration, the PM is gradually accumulated in the pores of the porous partition walls. Such accumulation of the PM lowers the substantive porosity of the porous partition walls immediately after a start of the PM-trapping action and thereby causes an abrupt increase of the pressure drop.

In one proposed structure of the honeycomb filter disclosed in Utility Model Registration No. 2607898, a surface layer having smaller pores than the pores of the porous partition wall is formed on the inner surface of each of the inlet opening cells. This proposed structure enables the PM contained in the exhaust emission to be trapped by the surface of the surface layer even at the beginning of the PM-trapping action and accordingly prevents the PM from invading into the pores of the porous partition walls. This PM-trapping action does not lower the substantive porosity of the porous partition walls and prevents an abrupt increase of the pressure drop discussed above.

PATENT DOCUMENTS

[Patent Document 1] Utility Model Registration No. 2607898

SUMMARY OF THE INVENTION

The honeycomb filter with the surface layers formed on the inner surfaces of the respective inlet opening cells may be located in the downstream of a diesel engine. Driving the diesel engine under a high-speed, high-loading condition causes the surface layer to be flaked off. The continuous use of the honeycomb filter in this condition causes the overall surface layer to be collapsed from the flaking point as a starting point and results in an abrupt increase of the pressure drop. The cause analysis of this problem shows generation of separation vortexes of the exhaust emission flow in the vicinity of the inlets of the respective inlet opening cells. The negative pressure of the separation vortex induces flaking of the surface layer and produces flakes of the surface layer. The flakes of the surface layer are assumed to collide against the undamaged part of the surface layer and collapse the overall surface layer.

In order to solve the problems of the prior art structures discussed above, there would be a requirement to prevent flaking of surface layers formed to cover over inner surfaces of inlet opening cells.

In order to accomplish at least part of the requirement mentioned above and the other relevant requirements, one aspect of the invention is directed to a honeycomb filter. A honeycomb filter structured to have a large number of cells parted by porous partition walls, where the large number of cells include inlet opening cells with open inlets and outlets sealed with outlet sealing members and outlet opening cells with inlets sealed with inlet sealing members and open outlets, the inlet opening cells and the outlet opening cells are arranged alternately to be adjacent to each other, and each of the inlet opening cells has an inner surface covered with a surface layer having smaller pores than pores of the porous partition walls, wherein the surface layer has substantially zero film thickness in an inlet peripheral region that represents an area extended from the open inlet of the inlet opening cell to a specific depth corresponding to a length of the inlet sealing members of adjacent outlet opening cells opposite to the inner surface of the inlet opening cell.

In the honeycomb filter according to this aspect of the invention, PM-containing exhaust emission flows via the open inlets of the inlet opening cells into the inlet opening cells and sequentially passes through the surface layers and the porous partition walls in this order. The PM-containing exhaust emission then flows into the outlet opening cells adjacent to the respective inlet opening cells and is released via the open outlets of the outlet opening cells to the atmosphere. This structure enables the PM contained in the exhaust emission to be trapped by the surface of the surface layers even at the beginning of the PM-trapping action and accordingly prevents the PM from invading into the pores of the porous partition walls. This PM-trapping action does not lower the substantive porosity of the porous partition walls and prevents an abrupt increase of the pressure drop. The porous partition wall in the inlet peripheral region of each inlet opening cell is surrounded by the inlet sealing members for sealing the inlets of the adjoining outlet opening cells adjacent to the inlet opening cell. This structure prevents the substantive passage of the exhaust emission through the porous partition walls in the inlet peripheral region. Separation vortexes are generated in the inlet peripheral regions. The zero film thickness of the surface layers or substantially non-existence of the surface layers in the inlet peripheral regions naturally causes non-flaking of the surface layers induced by the separation vortexes generated in the inlet peripheral regions and thereby leads to non-production of flakes. In the non-existent condition of flakes, the overall surface layers are not collapsed by collision of the flakes. The honeycomb filter according to this aspect of the invention effectively prevents flaking of the surface layers formed to cover over the inner surfaces of the respective inlet opening cells.

In one preferable embodiment of the honeycomb filter according to the above aspect of the invention, the surface layer formed on the inner surface of each inlet opening cell has a taper section where a film thickness gradually increases from a terminal end of the inlet peripheral region toward the outlet of the inlet opening cell. The exhaust emission flowing into each of the inlet opening cells hits against the tapered section of the surface layer. This arrangement effectively prevents the surface layer from being flaked off. In the remaining area of each inlet opening cell other than the inlet peripheral region, the exhaust emission sequentially passes through the surface layer and the porous partition wall in this order. The surface layer is thus pressed against the porous partition wall by the flow of the exhaust emission and is not readily flaked off.

In another preferable embodiment of the honeycomb filter according to the above aspect of the invention, a catalyst is supported on at least one of the porous partition walls and the surface layers. The catalyst may be supported only on the porous partition walls, may be supported only on the surface layers, or may be supported on both the porous partition walls and the surface layers. An oxidation catalyst usable as the catalyst of the invention accelerates oxidation of the trapped PM. This arrangement desirably facilitates regeneration of the honeycomb filter.

According to another aspect of the invention is a manufacturing method of such a honeycomb filter. The manufacturing method includes the steps of:

(a) producing a honeycomb structure having a large number of cells parted by porous partition walls, where the large number of cells include inlet opening cells with open inlets and outlets sealed with outlet sealing members and outlet opening cells with inlets sealed with inlet sealing members and open outlets, the inlet opening cells and the outlet opening cells are arranged alternately to be adjacent to each other;

(b) after the step (a), forming a protective film on an inner surface of each of the inlet opening cells in an inlet peripheral region that represents an area extended from the open inlet of the inlet opening cell to a specific depth corresponding to a length of the inlet sealing members of adjacent outlet opening cells;

(c) after the step (b), preparing a slurry as an aqueous dispersion of a material mixture for surface layers and applying the slurry onto the inner surface of each inlet opening cell; and (d) after the step (c), removing the protective films from the honeycomb structure.

The manufacturing method according to this aspect of the invention forms the protective film on the inner surface of each of the inlet opening cells included in the honeycomb structure in the inlet peripheral region defined as the area extended from the open inlet of the inlet opening cell to the specific depth corresponding to the length of the inlet sealing members of adjacent outlet opening cells. The manufacturing method subsequently applies the slurry prepared as the aqueous dispersion of the material mixture for the surface layers onto the inner surface of each inlet opening cell. The slurry adheres to the porous partition wall in the remaining area other than the inlet peripheral region on the inner surface of each inlet opening cell. The presence of the protective film formed on the porous partition wall in the inlet peripheral region, however, interferes with attachment of the slurry. The protective film may be made of a material having a slurry-repellent property or alternatively may be made of a material having a slurry-acceptable property. In any case, no slurry adheres to the porous partition wall in the inlet peripheral region. The manufacturing method then removes the protective films, so that no surface layers are formed in the inlet peripheral regions. The manufacturing method according to this aspect of the invention is thus adequately adopted to attain the zero film thickness of the surface layer in the inlet peripheral region on the inner surface of each inlet opening cell.

In one preferable application of the manufacturing method according to the above aspect of the invention, the step (b) forms the protective films from a pyrolytic organic substance. The step (d) removes the protective films by heat treatment of the honeycomb structure at a pyrolysis temperature of the protective films. This arrangement facilitates removal of the protective films, compared with a prior art technique of grinding off and removing the protective films.

DETAILED DESCRIPTION OF THE INVENTION

Figure 1:
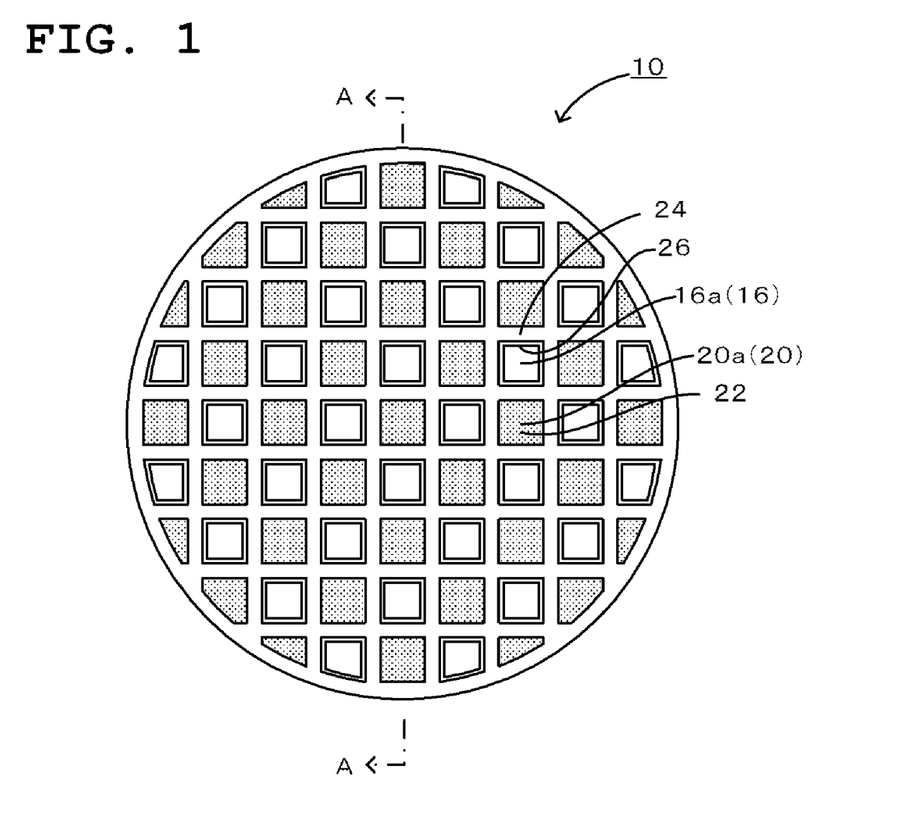
FIG. 1 is a front view illustrating a honeycomb filter 10.
Figure 2:
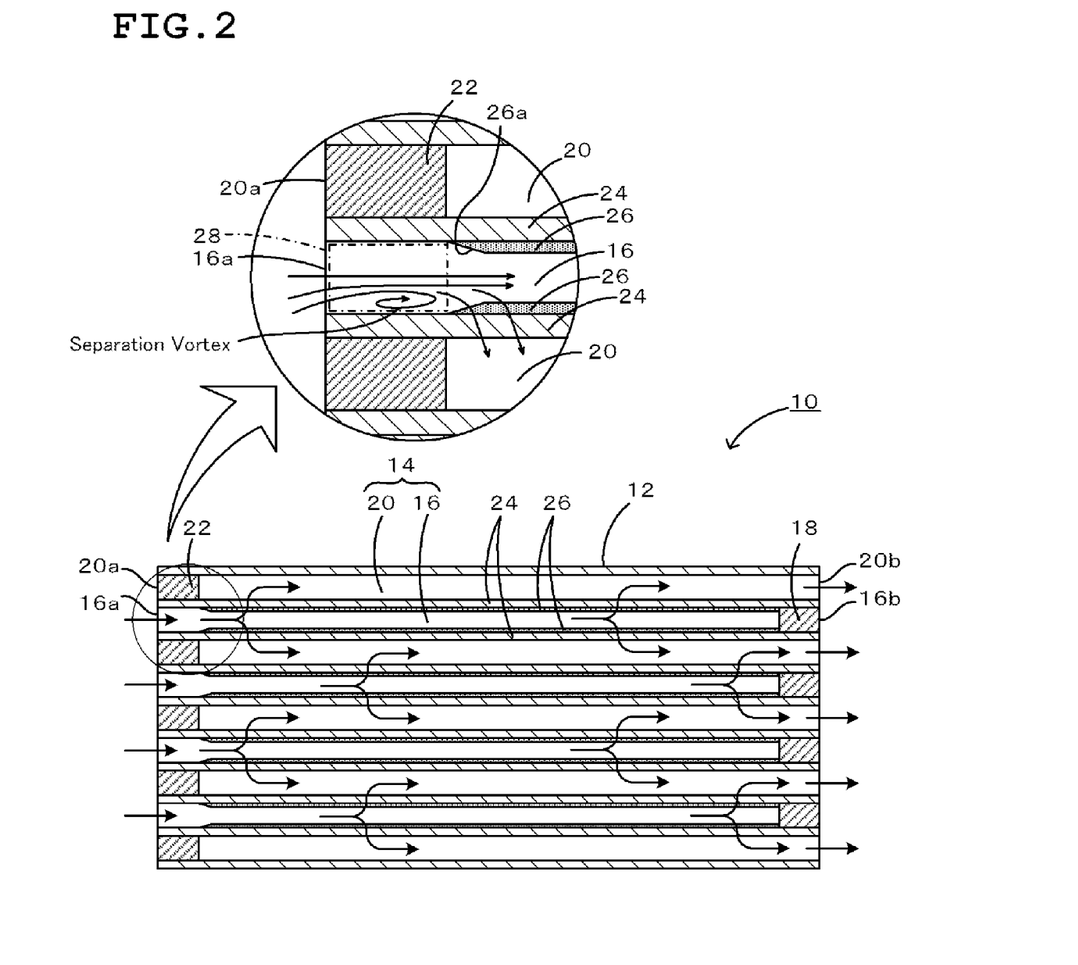
FIG. 2 is an A-A sectional view, taken on a line A-A in FIG. 1.

One preferable embodiment of the honeycomb filter according to the invention is discussed below with reference to the accompanied drawings. FIG. 1 is a front view illustrating a honeycomb filter 10 of this embodiment. FIG. 2 is an A-A sectional view, taken on a line A-A in FIG. 1.

The honeycomb filter 10 is constructed as a diesel particulate filter (DPF) having a filtration function for filtering out the PM (particulate matter) included in an exhaust emission of a diesel engine. The honeycomb filter 10 has a honeycomb structure 12 as a base and inlet opening cells 16 with surface layers 26 formed on respective inner surfaces thereof.

The honeycomb structure 12 has a large number of cells 14 parted by porous partition walls 24. From the aspects of the strength and the heat resistance, the material of the porous partition walls 24 is preferably selected from the group consisting of silicon-silicon carbide complex material, silicon carbide, cordierite, aluminum titanate, mullite, silicon nitride, and sialon. Especially preferable are silicon carbide and silicon-silicon carbide complex material. The porous partition walls 24 have a thickness preferably in a range of not less than 200 µm but less than 600 µm. The greater thickness of the porous partition walls 24 enhances a trapping efficiency, while increasing an initial pressure drop. This numerical range is thus preferable for the thickness by taking into account the trade-off between the trapping efficiency and the initial pressure drop and a pressure drop in a PM accumulation state. The porous partition walls 24 have an average pore diameter (measured by the mercury intrusion technique) preferably in a range of not less than 10 μm but less than 60 μm and a porosity preferably in a range of not less than 40% but less than 65%. As shown in FIG. 2, the large number of cells 14 formed in the honeycomb structure 12 include inlet opening cells 16 having open inlets 16a and outlets 16b sealed with outlet sealing members 18, and outlet opening cells 20 having inlets 20a sealed with inlet sealing members 22 and open outlets 20b. The inlet opening cells 16 and the outlet opening cells 20 are arranged alternately to be adjacent to each other. The cell density is preferably in a range of not less than 15 cells/cm$^2$ but less than 65 cells/cm$^2$.

The surface layer 26 is a film covering over the inner surface of each inlet opening cell 16 and has smaller pores than those of the porous partition walls 24. The surface layer 26 formed on the inner surface of the inlet opening cell 16 has zero film thickness in an inlet peripheral region 28. The inlet peripheral region 28 represents an area extended from the inlet 16a of the inlet opening cell 16 to a specific depth corresponding to the length of the inlet sealing member 22 for sealing the inlet 20a of the outlet opening cell 20. The surface layer 26 has a tapered section 26a of a varying film thickness, where the film thickness gradually increases from a terminal end of the inlet peripheral region 28 toward the outlet 16b. The surface layer 26 may be obtained by applying a slurry and drying the applied slurry. The slurry may be prepared by mining powder of the material used for the porous partition walls 24, an organic binder (for example, polyvinyl alcohol, methyl cellulose, ethyl cellulose, or carboxymethyl cellulose), a binding agent (for example, colloidal silica), and water. The thickness of the surface layer 26 is preferably not lower than 0.5% but lower than 30% of the thickness of the porous partition walls 24. This numerical range desirably assures both a relatively small pressure drop in the PM accumulation state and a relatively small initial pressure drop in the initial state without accumulation of the PM. The surface layer 26 has a peak pore diameter that is smaller than that of the porous partition walls 24 and is preferably in a range of not less than 2 μm but less than 8 μm. The peak pore diameter of less than 2 μm may cause a large initial pressure drop in the initial state without accumulation of the PM. The peak pore diameter of greater than 8 μm, on the other hand, may worsen the trapping efficiency of the surface layer and may cause the PM to intrude into the pores of the porous partition walls. One concrete method of determining the peak pore diameter of the surface layer 26 measures a pore distribution (by the mercury intrusion technique) in the porous partition walls 24 with the surface layers 26 and a pore distribution in the porous partition walls 24 without the surface layers 26, specifies a difference between the measurement results as a pore distribution of the surface layer 26, and determines a peak value of the specified pore distribution as the peak pore diameter of the surface layer 26. The surface layer 26 has a porosity preferably in a range of not less than but less than 80%. The porosity of not less than 40% desirably has the significant effect of reducing the pressure drop in the PM accumulation state. The porosity of greater than 80% may, however, lower the durability of the film of the surface layer 26. In order to accelerate oxidation of the accumulated PM, a catalyst containing at least one of platinum and palladium may be supported on the surface layer 26.

Figure 3:
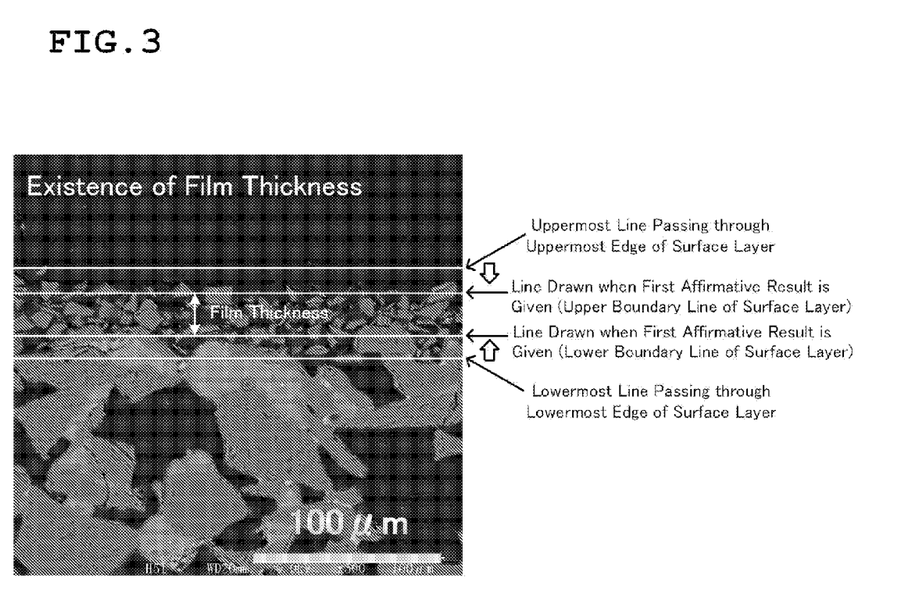
FIG. 3 is an SEM micrograph showing a procedure of determining a film thickness of a surface layer.

As mentioned above, the surface layer 26 has zero film thickness in the inlet peripheral region 28. The state that the surface layer 26 has zero film thickness includes specific states determined according to a procedure discussed below, in addition to the actually non-existent state of the surface layer 26. In an SEM image (see FIG. 3) of a polished cross sectional surface in the inlet peripheral region 28 of the inlet opening cell 16 taken with an SEM (scanning electron microscope) at 200-fold magnification, the procedure draws an uppermost line passing through an uppermost edge of the surface layer 26 and a lowermost line passing through a lowermost edge of the surface layer 26. These uppermost line and lowermost line are parallel to an axial direction of the inlet opening cells 16 and are spanned between both sides of the plane of the SEM image. The surface layer 26 consists of particles (hereafter referred to as 'surface layer constituent particles'). The procedure identifies the non-existence of the surface layer constituent particles at any place on the uppermost line where two adjacent surface layer constituent particles are parted away by a constituent particle of the porous partition walls 24 (a particle having a greater particle diameter than an average particle diameter of the constituent particles of the porous partition walls 24) or at any place on the uppermost line where two adjacent surface layer constituent particles are parted away across a space of at least 6 times as large as an average particle diameter of the surface layer constituent particles. The procedure identifies the existence of the surface layer constituent particles at any place on the uppermost line where two adjacent surface layer constituent particles are parted away across a space of less than 4 times as large as the average particle diameter of the surface layer constituent particles. The procedure then determines whether the overall rate of the surface layer constituent particles to the uppermost line passing through the uppermost edge reaches or exceeds 50%. In the case of a negative result, the procedure moves the uppermost line downward by a distance corresponding to the average particle diameter of the surface layer constituent particles and redraws a line. The above identification and determination are repeated with regard to the redrawn line, until the determination gives an affirmative result. The redrawn line when the affirmative result is given is specified as an upper boundary line of the surface layer 26. The similar identification and determination are performed with regard to the lowermost line passing through the lowermost edge. In the case of a negative result, the procedure moves the lowermost line upward by a distance corresponding to the average particle diameter of the surface layer constituent particles and redraws a line. The above identification and determination are repeated with regard to the redrawn line, until the determination gives an affirmative result. The redrawn line when the affirmative result is given is specified as a lower boundary line of the surface layer 26. After specification of the upper boundary line and the lower boundary line of the surface layer 26 in this manner, the procedure defines a distance between the upper boundary line and the lower boundary line as a film thickness of the surface layer 26. The surface layer 26 is accordingly determined to have zero film thickness, for example, in the case where the upper boundary line is identical with the lower boundary line, in the case where the upper boundary line or the lower boundary cannot be specified for any reason, or in the case where the uppermost line passing through the uppermost edge or the lowermost line passing through the lowermost edge cannot be drawn for any reason.

Figure 4:
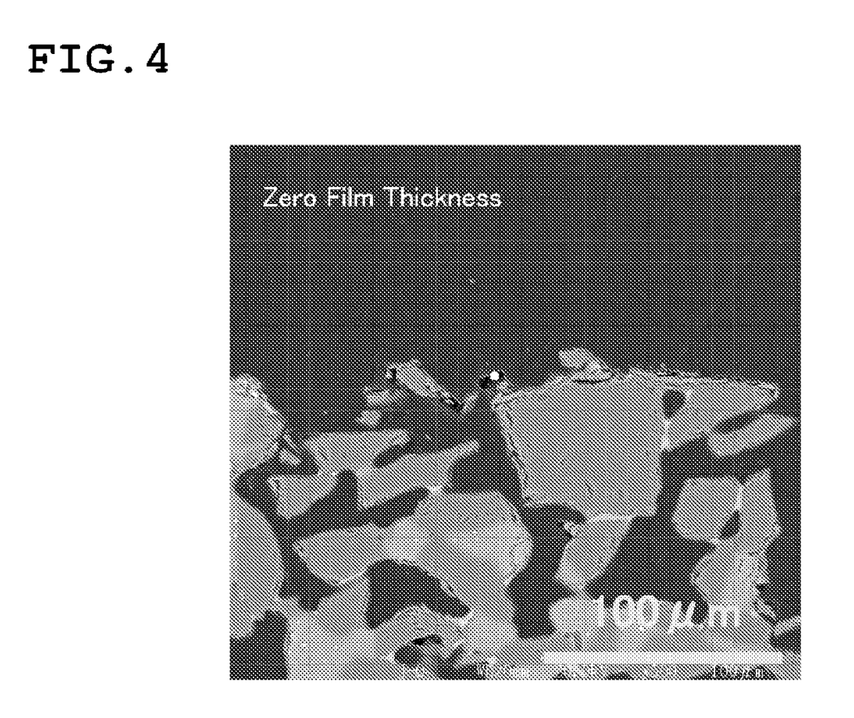
FIG. 4 is an SEM micrograph showing one example with zero film thickness of the surface layer.
Figure 5:
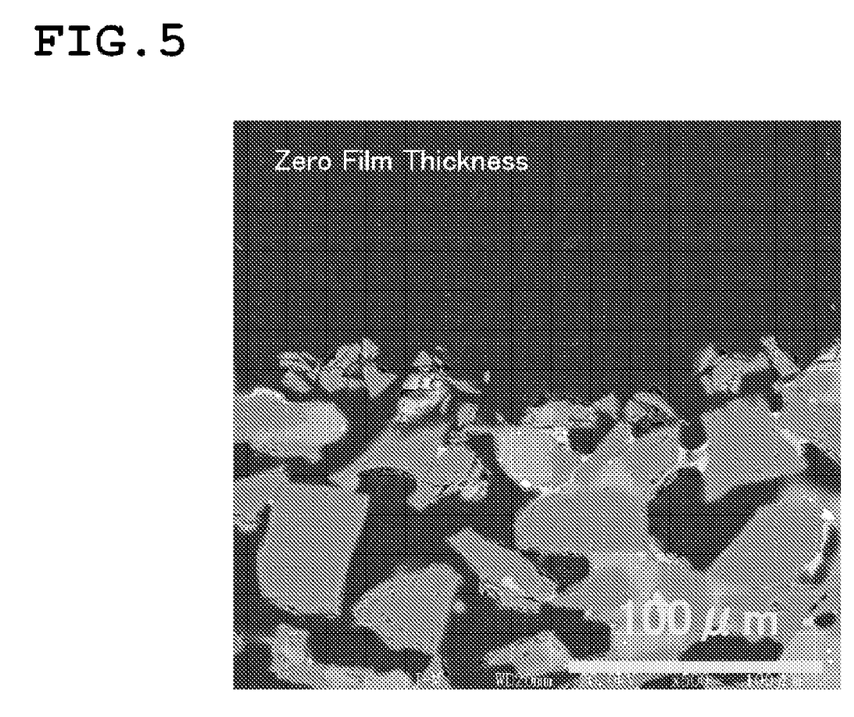
FIG. 5 is an SEM micrograph showing another example with zero film thickness of the surface layer.
Figure 6:
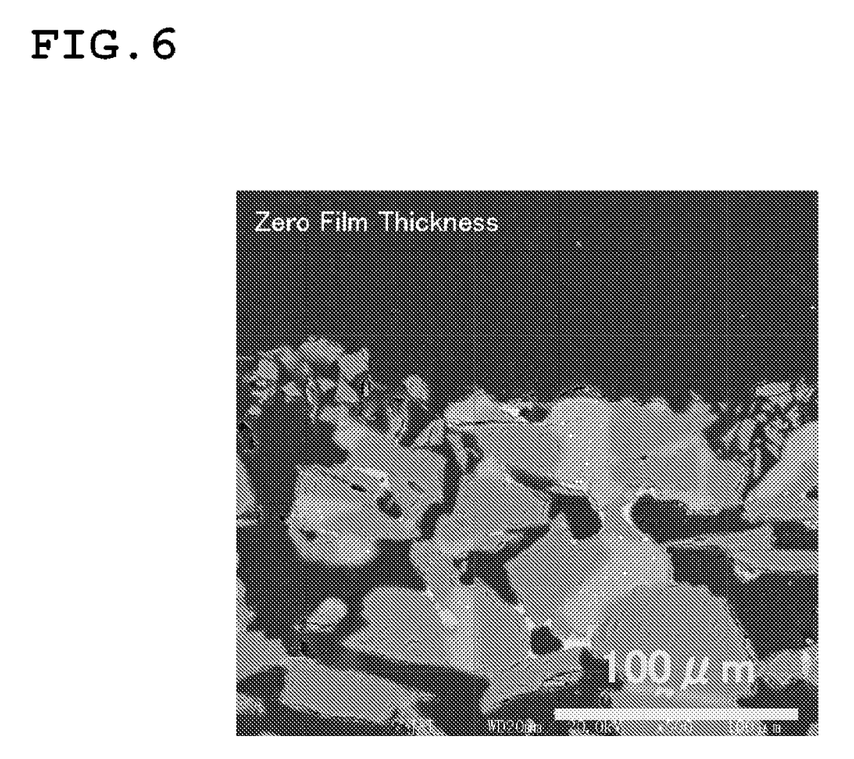
FIG. 6 is an SEM micrograph showing sill another example with zero film thickness of the surface layer.
Figure 7:
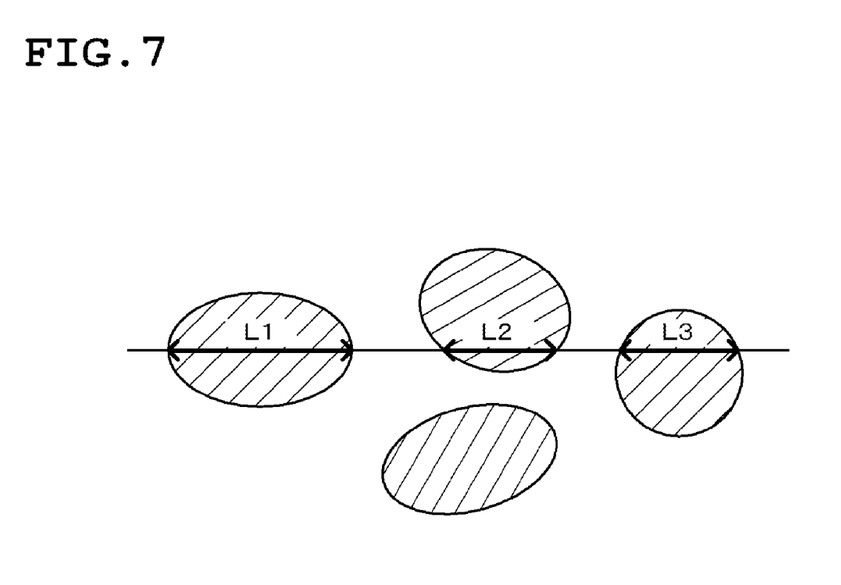
FIG. 7 is an explanatory view showing a method of measuring an average particle diameter.

In the illustrated example of FIG. 4, since no surface layer constituent particles are observable on the porous partition walls 24, the uppermost line passing through the uppermost edge or the lowermost line passing through the lowermost edge cannot be drawn. The surface layer 26 is thus determined to have zero film thickness in this example. In the illustrated examples of FIGS. 5 and 6, since some surface layer constituent particles are observable on the porous partition walls 24, the uppermost line passing through the uppermost edge or the lowermost line passing through the lowermost edge can be drawn. On the uppermost line passing through the uppermost edge, however, adjacent surface layer constituent particles are parted away across the space of at least 6 times as large as the average particle diameter of the surface layer constituent particles, or adjacent surface layer constituent particles are parted away by the constituent particle of the porous partition walls 24 (the particle having the greater particle diameter than the average particle diameter of the constituent particles of the porous partition walls 24). The above determination accordingly gives a negative result. The procedure then moves the uppermost line downward by the distance corresponding to the average particle diameter of the surface layer constituent particles to redraw a line and repeats the identification and the determination with regard to the redrawn line as discussed above. The determination still gives a negative result, however, even when the redrawn line reaches or exceeds the lowermost line passing through the lowermost edge. Namely the upper boundary line cannot be drawn. The surface layer 26 is thus determined to have zero film thickness in these examples. A method adopted in this embodiment to determine the average particle diameter draws a line including particles on an SEM image, divides a summation of the traversing lengths of the particles on the drawn line by the number of the particles on the drawn line, and specifies the result of the division as a provisional particle diameter (for example, (L1+L2++L3)/3 in the example of FIG. 7). The method calculates the provisional particle diameter three times with regard to three different drawn lines and specifies an average of the three provisional particle diameters as the average particle diameter.

The honeycomb filter 10 of the above structure has the functions discussed below. In this embodiment, the honeycomb filter 10 is located in the downstream of a diesel engine (not shown) to clean up a PM-containing exhaust emission and release the cleaned emission to the atmosphere. Arrows in FIG. 2 represent the flow of the exhaust emission. The PM-containing exhaust emission from the diesel engine flows via the inlets 16*a* of the inlet opening cells 16 into the respective inlet opening cells 16 of the honeycomb filter 10 and sequentially passes through the surface layers 26 and the porous partition walls 24 in this order. The PM-containing exhaust emission then flow into the outlet opening cells 20 adjacent to the respective inlet opening cells 16 and is released via the outlets 20*b* of the outlet opening cells 20 to the atmosphere. The PM is trapped, as the PM-containing exhaust emission penetrates from the inlet opening cells 16 through the surface layers 26 and the porous partition walls 24 and flows into the outlet opening cells 20. The exhaust emission flowing into the outlet opening cells 20 is accordingly the PM-free clean emission. This structure enables the PM contained in the exhaust emission to be trapped by the surface of the surface layers 26 even at the beginning of the PM-trapping action and accordingly prevents the PM from invading into the pores of the porous partition walls 24. Namely no depth filtration occurs in this structure. This PM-trapping action does not lower the substantive porosity of the porous partition walls 24 and prevents an abrupt increase of the pressure drop due to the depth filtration. The porous partition wall 24 in the inlet peripheral region 28 of each inlet opening cell 16 is surrounded by the inlet sealing members 22 for sealing the inlets 20*a* of the adjoining outlet opening cells 20 adjacent to the inlet opening cell 16. This structure prevents the substantive passage of the exhaust emission through the porous partition walls 24 in the inlet peripheral region 28. Separation vortexes are generated in the inlet peripheral regions 28. The zero film thickness of the surface layers 26 or substantially non-existence of the surface layers 26 in the inlet peripheral regions 28 naturally causes non-flaking of the surface layers 26 induced by the separation vortexes generated in the inlet peripheral regions 28 and thereby leads to non-production of flakes. In the non-existent condition of flakes, the overall surface layers 26 are not collapsed by collision of the flakes.

One concrete procedure of manufacturing the honeycomb filter 10 is described below with reference to FIG. 8. The manufacturing procedure adopted herein manufactures the honeycomb filter 10 by the steps of (a) producing the honeycomb structure 12, (b) forming protective films 32, (c) applying a surface layer slurry 34, and (d) removing the protective films 32. The manufacturing method of the honeycomb filter 10 is, however, not restricted to this procedure but may be modified in various ways as long as the honeycomb filter 10 is obtained.

(a) Producing Honeycomb Structure 12

The procedure blends and kneads any material selected among the available materials for the porous partition walls 24 mentioned above with an organic binder, a surface active agent, and a pore forming agent to prepare a pug. A kneader or a vacuum pug mill may be used for blending and kneading. The procedure subsequently produces a honeycomb compact with a large number of cells by extruding, injection molding, or pressing the pug. The procedure seals the every other openings of cells arrayed on one face (inlet face) of the honeycomb compact with sealing members, and seals the every other openings of unsealed cells arrayed on the other face (outlet face) with sealing members. The sealing technique is not specifically limited to the following but may prepare a sealing slurry from the material mixture used for molding the honeycomb compact in a container, cover over the inlet face of the honeycomb compact with a mask having holes perforated at specific positions opposed to the sealing object openings of the cells, and soak the honeycomb compact with facing the masked inlet face down in the sealing slurry to a preset depth (corresponding to expected lengths of the sealing members). The sealing object openings of the cells are accordingly sealed with the sealing members. The sealing object openings of the cells on the outlet face are similarly sealed by the sealing technique. The procedure then dries the honeycomb compact with the sealing object openings of the cells sealed with the sealing members. The drying technique is not specifically limited to any of the following but may be, for example, hot air drying, microwave drying, dielectric drying, or reduced-pressure drying. The procedure calcines the dried honeycomb compact, prior to firing. This calcining step burns out and removes the organic substances (for example, the organic binder and the pore forming agent) included in the honeycomb compact. The burning temperature of the organic binder is generally in a temperature range of about 100° C. to 300° C., and the burning temperature of the pore forming agent is generally in a temperature range of about 200° C. to 800° C. The temperature of the calcining is thus set to a temperature range of about 200° C. to 1000° C. The calcining time is adequately set according to the types of the organic substances used for the molding materials but may be generally in a range of about 1 to 50 hours. The procedure finally fires the calcined honeycomb compact (firing step). This completes the honeycomb structure 12 with the large number of cells 14 (including the inlet opening cells 16 and the outlet opening cells 20) (see FIG. 8A). The temperature and the time of the firing are adequately set according to the types of the molding materials. The procedure of this illustrated example produces the honeycomb compact having the same shape and the same dimensions as those of the honeycomb structure 12 by extrusion. One modified method may produce honeycomb segment compacts having quadrangular (for example, square) cross sections by extrusion and complete honeycomb segments through the sealing step with sealing members, the drying step, the calcining step, and the firing step discussed above. The modified method may subsequently join a preset number of multiple honeycomb segments with a joint material to form a prismatic laminate body, cut out a cylindrical body from the prismatic laminate body, and coat the outer circumference of the cylindrical body with a coating material to complete the honeycomb structure 12.

(b) Forming Protective Films 32

The procedure forms a protective film 32 in the inlet peripheral region 28 on the inner surface of each inlet opening cell 16 formed in the honeycomb structure 12 (see FIG. 5E). As mentioned above, the inlet peripheral region 28 represents the area extended from the inlet 16a of the inlet opening cell 16 to the specific depth corresponding to the length of the inlet sealing member 22 of the outlet opening cell 20. The protective film 32 is formed to prevent a surface layer slurry 34 prepared by dispersing the material mixture for the surface layer 26 in water from adhering to the inlet peripheral region 28 in the subsequent slurry applying step. The protective films 32 may be made of any material having the function of preventing attachment of the surface layer slurry 34. By taking into account the presence of water in the aqueous dispersion of the surface layer slurry 34, the material of the protective films 32 is desired to have water repellency. By taking into account the easy removal of the protective films 32, the material of the protective films 32 is preferably a pyrolytic organic substance. Preferable examples of the material for the protective films 32 accordingly include wax, polymer films, and fluororesins. For example, when wax is used as the material for the protective films 32, one concrete method melts wax in a container, soaks the honeycomb structure 12 with facing the inlet face down in the molten wax in the container to a specific depth corresponding to the length of the inlet peripheral region 28, and pulls up the honeycomb structure 12 to coat the inner surface in the inlet peripheral region 28 with the wax. Another concrete method directly applies solid wax onto the inner surface in the inlet peripheral region 28.

(c) Applying Surface Layer Slurry 34

Figure 8:
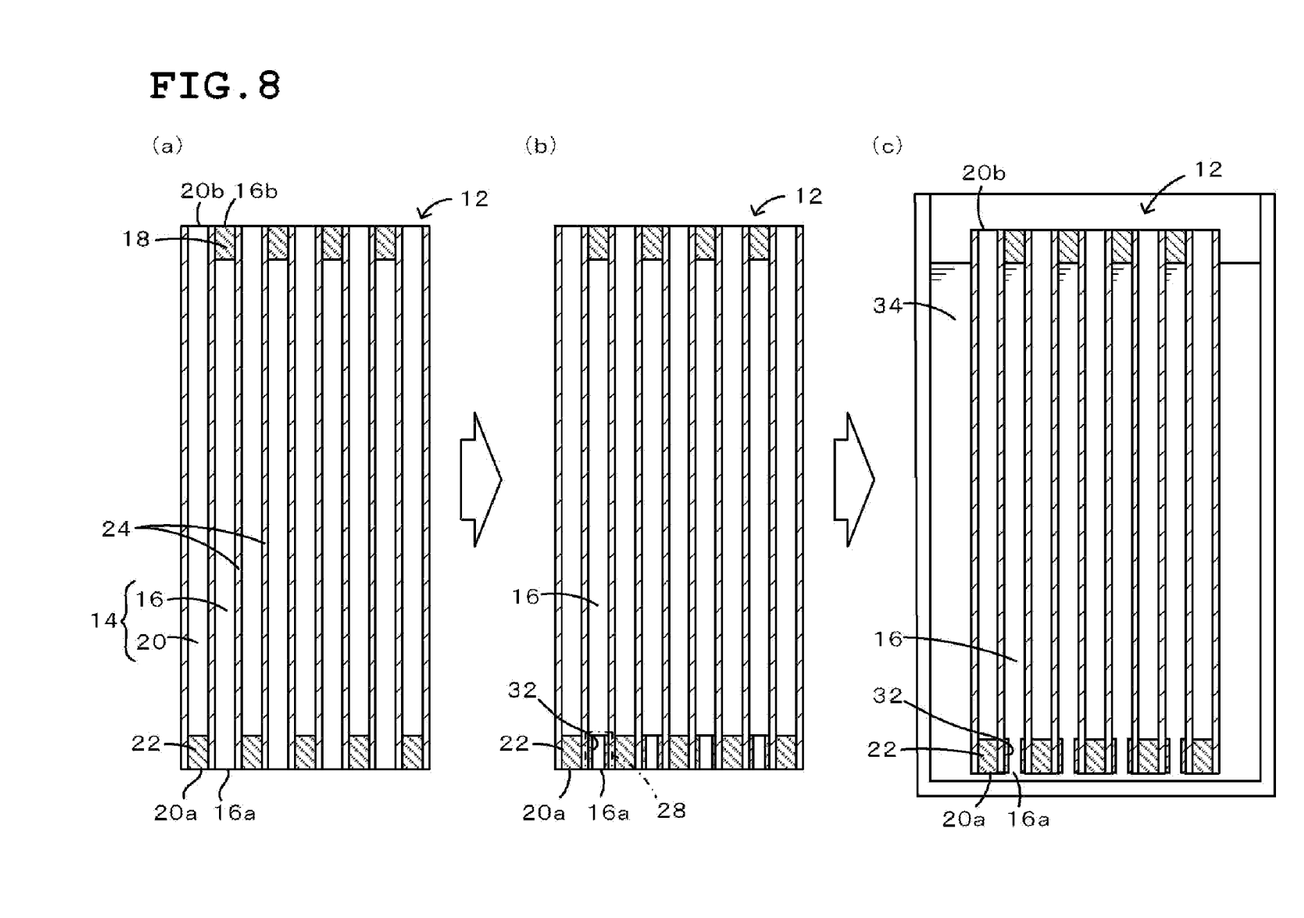
FIG. 8 is an explanatory view showing a procedure of forming protective films 32 on a honeycomb structure 12 and applying a surface layer slurry.

The procedure soaks the honeycomb structure 12 having the protective films 32 with facing the inlets 16a of the inlet opening cells 16 down in the surface layer slurry 34 as the water dispersion of the material mixture for the surface layers 26, so as to fill the inlet opening cells 16 with the surface layer slurry 34 (see FIG. 8C). The whole honeycomb structure 12 may be sunk in the surface layer slurry 34. Since the outlet opening cells 20 are not required to be filled with the surface layer slurry 34, however, the honeycomb structure 12 may be sunk in the surface layer slurry 34 in such a manner as to locate the outlets 20b of the outlet opening cells 20 slightly higher than the fluid level of the surface layer slurry 34. The soaking time is arbitrarily set according to the density of the surface layer slurry 34 and other relevant factors. After completion of the soaking step, the procedure pulls the honeycomb structure 12 out of the surface layer slurry 34 and dries the honeycomb structure 12 with facing the inlet face up. The applied surface layer slurry 34 moves by its own weight to form a reverse taper from the rear edge of the inlet peripheral region 28 to the depth in each inlet opening cell 16. One modified method may set the honeycomb structure 12 with facing the inlet face up, pour the surface layer slurry 34 onto the honeycomb structure 12 to fill the inlet opening cells 16 with the surface layer slurry 34, and suck out and drain the remaining slurry from the outlet face. Another modified method may set the honeycomb structure 12 with facing the inlet face down, press feed the surface layer slurry 34 to the honeycomb structure 12 to fill the inlet opening cells 16 with the surface layer slurry 34, and suck out and drain the remaining slurry from the outlet face.

(d) Removing Protective Films 32

The procedure removes the protective film 32 from the inlet peripheral region 28 in each inlet opening cell 16. The protective film 32 may be physically removed by, for example, polishing. For the protective film 32 made of the pyrolytic organic substance, the honeycomb structure 12 with the surface layer slurry 34 applied thereon is subjected to heat treatment at a temperature of not lower than a pyrolysis temperature of the organic substance. Such heat treatment readily removes the protective film 32. In the case of physical removal of the protective film 32, heat treatment is required to fix the applied surface layer slurry 34 in the inlet peripheral region 28 on the surface of the porous partition wall and thereby form the surface layer 26. In the case of pyrolytic removal of the protective film 32, the heat treatment fixes the applied surface layer slurry 34 on the surface of the porous partition wall to form the surface layer 26, concurrently with the removal of the protective film 32. The latter technique desirably simplifies the manufacturing process of the honeycomb filter 10.

(e) Supporting Catalyst

The procedure supports a catalyst on the honeycomb structure 12 after removal of the protective films 32 to complete the honeycomb filter 10. One concrete method of the catalyst supporting step prepares a catalyst slurry and makes the catalyst slurry sucked in via the outlet face of the honeycomb structure 12 and flowed into the outlet opening cells 20. This causes a major quantity of the catalyst to be supported on the surface layers 26. Another concrete method of the catalyst supporting step makes the catalyst slurry flowed into both the inlet opening cells 16 and the outlet opening cells 20. This causes the catalyst to be supported on both the porous partition walls 24 and the surface layers 26. The catalyst may be supported only on the porous partition walls 24, may be supported only on the surface layers 26, or may be supported on both the porous partition walls 24 and the surface layers 26. The catalyst is not specifically limited to the following but may be, for example, an oxidation catalyst for accelerating oxidation of the PM. Noble metals, such as platinum (Pt), palladium (Pd), and rhodium (Rh), are preferably used as the oxidation catalyst. The oxidation catalyst may be replaced with another catalyst or a cleaning material. Available examples of the another catalyst and the cleaning material include NOx absorbing catalysts containing any of alkali metals (Li, Na, K, Cs and the like) and alkaline earth metals (Ca, Ba, Sr, and the like) three-way catalysts, promoters, such as cerium (Ce) oxide and/or zirconium (Zr) oxide, and HC (hydrocarbon) adsorbents. The oxidation catalyst may be a Ce compound containing at least one element selected from the group consisting of rare earth elements, alkaline earth metals, and transition metals. The at least one rare earth element is selected from, for example, Sm, Gd, Nd, Y, La, and Pr. The at least one alkaline earth metal is selected from, for example, Mg, Ca, Sr, and Ba. The at least one transition metal is selected from, for example, Mn, Fe, Co, Ni, Cu, Zn, Sc, Ti, V, and Cr. The catalyst supporting method is not restricted to the suction technique discussed above but may be any of catalyst supporting techniques known in the art. One modified procedure may apply the catalyst slurry on the porous partition walls 24, prior to application of the surface layer slurry, dry the applied catalyst slurry, and heat-treat the honeycomb structure 12 to support the catalyst only on the porous partition walls 24. Another modified procedure may apply a mixture of the surface layer slurry with a catalyst, dry the applied mixture, and heat-treated the honeycomb structure 12 to support the catalyst only on the surface layers 26. The catalyst used in this step is not limited to any of the examples mentioned above but may be any material assuring the effect of the invention.

In the honeycomb filter 10 of the embodiment discussed above, separation vortexes are generated in the inlet peripheral regions 28. The zero film thickness of the surface layers 26 or substantially non-existence of the surface layers 26 in the inlet peripheral regions 28 naturally causes non-flaking of the surface layers 26 induced by the separation vortexes generated in the inlet peripheral regions 28 and thereby leads to non-production of flakes. In the non-existent condition of flakes, the overall surface layers 26 are not collapsed by collision of the flakes. The honeycomb filter 10 of the embodiment thus effectively prevents flaking of the surface layers 26 formed to cover over the respective inner surfaces of the inlet opening cells 26. The surface layer 26 has the tapered section 26a, and the exhaust emission flowing into each of the inlet opening cells 16 hits against the tapered section 26a. This arrangement effectively prevents the surface layer 26 from being flaked off. In the remaining area of each inlet opening cell 16 other than the inlet peripheral region 28, the exhaust emission sequentially passes through the surface layer 26 and the porous partition wall 24 in this order. The surface layer 26 is thus pressed against the porous partition wall 24 by the flow of the exhaust emission and is not readily flaked off.

The embodiment and its applications discussed above are to be considered in all aspects as illustrative and not restrictive. As those skilled in the art will readily appreciate, there may be many modifications, changes, and alterations without departing from the scope or spirit of the main characteristics of the present invention.

EXAMPLES

Working Example 1

A honeycomb filter of Working Example 1 was manufactured by the steps of (a) producing a honeycomb structure, (b) forming protective films, (c) applying a surface layer slurry, (d) removing the protective films, and (e) applying a catalyst.

(a) Producing Honeycomb Structure

The procedure of Working Example 1 prepared honeycomb segment compacts having square cross sections and completed honeycomb segments through the sealing step with sealing members, the drying step, the calcining step, and the firing step as discussed above. The procedure subsequently joined a preset number of multiple honeycomb segments with a joint material to form a prismatic laminate body, cut out a cylindrical body from the prismatic laminate body, and coated the outer circumference of the cylindrical body with a coating material to complete a honeycomb structure.

The procedure mixed 80 parts by weight of SiC powder having the average particle diameter of 32.6 μm with 20 parts by weight of metal Si powder having the average particle diameter of 4 μm, added 6 parts by weight of methyl cellulose as an organic binder, 2.5 parts by weight of a surface active agent, and 24 parts by weight of water to the mixture, and homogeneously blended and kneaded the mixture to prepare a molding pug. The procedure extruded the molding pug to extrudates and dried the extrudates by microwave drying and hot air drying to produce honeycomb segment compacts having the partition wall thickness of 310 μm (12 mil), the cell density of about 46.5 cells/cm$^2$ (300 cells/sq. in.), the 35 mm-square cross section, and the length of 152 mm. The procedure sealed the every other openings of cells on one face (inlet face) of each honeycomb segment compact with sealing members, and sealed the every other openings of unsealed cells on the other face (outlet face) of each honeycomb segment compact with sealing members. The sealing member was made of the same material as the material mixture of the honeycomb segment compacts and was set to have the length of 5 mm. The procedure dried the honeycomb segment compacts with the openings sealed with the sealing members, degreased the dried honeycomb segment compacts in the air atmosphere at about 400° C., and fired the honeycomb segment compacts in an argon atmosphere at about 1450° C. This produced honeycomb segments of the porous structure with the SiC particles bound by means of Si particles. The obtained honeycomb segments had the average pore diameter of 15 μm and the porosity of 49.0%.

The procedure mixed aluminosilicate fibers as inorganic fibers, colloidal silica as an inorganic binder, and Sic as clay and inorganic particles, added water to the mixture, and kneaded the mixture with a blender for 30 minutes to prepare paste of a joint material. The procedure then spread over the paste of the joint material to a thickness of about 1 mm on the outer wall face of each honeycomb segment to form a joint material layer and laid one honeycomb segment on another honeycomb segment via the joint material layer. This series of work was repeated to form a laminate of total sixteen honeycomb segments with four in length and four in width. The procedure securely joined the laminate of the honeycomb segments under application of an external pressure, and dried the laminate at 140° C. for 2 hours to complete a honeycomb segment assembly. The procedure subsequently ground the outer circumference of the honeycomb segment assembly to a cylindrical body, applied a coating material on the cylindrical body, and dried and hardened the cylindrical body with the coating material at 700° C. for 2 hours to obtain a honeycomb structure. The honeycomb structure had a large number of cells including outlet opening cells with inlets sealed with sealing members and open outlets and inlet opening cells with open inlets and outlets sealed with sealing members.

(b) Forming Protective Films

The procedure applied wax on the inner surface of each of the inlet opening cells included in the honeycomb structure in the inlet peripheral region defined as the area extended from the open inlet to the specific depth corresponding to the length of the sealing members of the adjacent outlet opening cells. The inlet peripheral region of each inlet opening cell was accordingly coated with a protective film made of the wax.

(c) Applying Surface Layer Slurry

A surface layer slurry was prepared for formation of surface layers. The procedure dissolved 0.5 parts by weight of carboxymethyl cellulose as an organic binder in 95 parts by weight of water to prepare an aqueous solution, sequentially added 2.5 parts by weight of SiC powder having the average particle diameter of 10 μm as a powdery aggregate and 5 parts by weight of a colloidal silica solution (solid content of 40%) as a joint material to the aqueous solution in this order, and stirred the mixture to prepare a surface layer slurry. The procedure soaked the honeycomb structure having the inlet peripheral regions covered with the protective films with facing the inlet face down into the surface layer slurry to leave a specific depth corresponding to the expected lengths of outlet sealing members and pulled the honeycomb structure out of the surface layer slurry. The remaining area on the inner surface of each inlet opening cell other than the inlet peripheral region covered with the protective film was accordingly dip-coated with the surface layer slurry.

(d) Removing Protective Films

The procedure dried the dip-coated honeycomb structure with facing the inlet face up and heat-treated the dried honeycomb structure at 700° C. for 0.5 hours. The heat treatment decomposed the protective films into carbon dioxide and water and thereby removed the protective films, concurrently with fixation of the surface layers onto the surface of the porous partition walls.

(e) Applying Catalyst

A honeycomb filter was completed by making a catalyst supported on the honeycomb structure. The procedure prepared a catalyst slurry by mixing a Pt-carried γ-$Al_2O_3$ catalyst and $CeO_2$ powder (promoter) with $Al_2O_3$ sol and water. The procedure then wash-coated the honeycomb filter with the prepared catalyst slurry to support the catalyst with a platinum content of 1.06 g/liter and an overall catalyst content of 30 g/liter. The catalyst supporting technique adopted here made the catalyst slurry flow from an end face of the honeycomb filter on an outflow side of the exhaust emission into the cells (cells on the outflow side of the exhaust emission). A major quantity of the catalyst was accordingly supported on the surface of the partition walls. The procedure subsequently dried the honeycomb filter with the catalyst slurry at 120° C. and heat-treated the honeycomb filter at 500° C. for 3 hours. This completed a catalyst-supported honeycomb filter of Working Example 1. The honeycomb filter of Working Example 1 had surface layers with the average film thickness of 38 μm (the average film thickness of 0 μm in the inlet peripheral regions), the average pore diameter of 3.2 μm, and the porosity of 48%. Each of the surface layers had a tapered section with the film thickness gradually increasing from a terminal end of the inlet peripheral region toward the outlet of the cell.

Comparative Example 1

A honeycomb filter of Comparative Example 1 was manufactured by a similar method to the procedure of Working Example 1 except omission of the step (b). The honeycomb filter of Comparative Example 1 had surface layers with the average film thickness of 40 μm (the average film thickness of 5 μm in the inlet peripheral regions).

Evaluations

The honeycomb filters of Working Example 1 and Comparative Example 1 were subjected to tests 1 through 4 discussed below. Comparison was made between a pressure drop before the test and a pressure drop after the test.

(Test 1) Measurement of Pressure Drop Before Test

Each honeycomb filter was mounted immediately below a turbo charger of a common rail-type 2.0-liter diesel engine. The engine was driven at a rotation speed of 2000 rpm with a constant torque of 50 Nm. A pressure drop was measured when the amount of accumulated soot per unit volume of the honeycomb filter reached 4 g/liter. The measurement result was defined as the pressure drop before the test.

(Test 2) High-Rotation, High-Loading Test

The engine was then driven under high-rotation, high-loading conditions of a rotation speed of 4000 rpm and a torque of 250 Nm.

(Test 3) Heating and Vibration Test

A hot vibration test was performed as a heating and vibration test. The honeycomb filter was detached from the diesel engine and was heat-treated with a heat cycle of 1000° C.×20 minutes and 500° C.×20 minutes with the air flowed through the honeycomb filter. A vibration of 30 G was continuously applied to the heat-treated honeycomb filter for 100 hours. The total flow of the air was set to 2 $m^3$.

(Test 4) Measurement of Pressure Drop after Test

The honeycomb filter was again mounted on the diesel engine. A pressure drop was measured again by the same method as the measurement of the initial pressure drop. The measurement result was defined as the pressure drop after the test. The measurement results of the pressure drop before the test and the pressure drop after the test with regard to both the honeycomb filters of Working Example 1 and Comparative Example 1 are shown in Table 1. Three honeycomb filters of Working Example 1 and three honeycomb filters of Comparative Example 1 were manufactured and were subjected to the tests 1 through 4. The values in Table 1 are average values of the respective three measurement results.

TABLE 1

|  | Pressure Drop | |
| --- | --- | --- |
|  | Before Test | After Test |
| Working Example 1 | 7.6 kPa | 7.6 kPa |
| Comparative Example 1 | 7.7 kPa | 11.1 kPa |

(Discussion)

In the honeycomb filter of Comparative Example 1, in the test 2, the surface layers in the inlet peripheral regions were flaked off due to the generation of separation vortexes. The flakes flowed downstream to collide against and chip off the surface layers in the downstream of the inlet peripheral regions in the test 3. Such collision was assumed to (damage and collapse the whole surface layers. In the test 4, the collapsing surface layers naturally had no substantive function and were assumed to have an increasing tendency of the pressure drop equivalent to an increasing tendency of the pressure drop observed in prior art porous partition walls without surface layers. In the honeycomb filter of Working Example 1, on the other hand, non-flaking of the surface layers was observed since the surface layers were not formed in the inlet peripheral regions where separation vortexes were generated. There was accordingly no significant variation of the pressure drop before and after the high rotation, high loading test and the heating and vibration test.

After the tests 1 through 4, soot accumulated on each of the honeycomb filters of Working Example 1 and Comparative Example 1 was fired off in an electric furnace. Each honeycomb filter was then held with its inlet face down and was tapped on its outlet face. SiC particles of the surface layers came out of the honeycomb filter of Comparative Example 1, while no such particles came out of the honeycomb filter of Working Example 1.

The porous partition walls were made of the silicon-silicon carbide complex material in Working Example 1. A honeycomb filter including porous partition walls made of cordierite may be manufactured by a similar method to the procedure of Working Example 1 by taking into account the disclosure in Japanese Patent Laid-Open No. 2008-272664 and Utility Mode Registration No. 2607898.

The present application claims the benefit of the priority from Japanese Patent Application No. 2009-086986 filed on Mar. 31, 2009, the entire contents of which are incorporated herein by reference.

What is claimed is:

1. A honeycomb filter structured to have a large number of cells parted by porous partition walls, where the large number of cells include (i) inlet opening cells that extend along a length of the honeycomb filter and have open inlets on an inlet side of the honeycomb filter and closed outlets on an outlet side of the honeycomb filter that are sealed with outlet sealing members, and (ii) outlet opening cells that extend along the length of the honeycomb filter and have closed inlets on the inlet side of the honeycomb filter sealed with inlet sealing members and open outlets on the outlet side of the honeycomb filter, the inlet opening cells and the outlet opening cells are arranged alternately to be adjacent to each other, and each of the inlet opening cells has an inner surface covered with a surface layer having smaller pores than pores of the porous partition walls,
wherein the surface layer has zero film thickness in an inlet peripheral region that represents an area extended from the open inlet of the opening cell to a specific depth corresponding to a length of the inlet sealing members of adjacent outlet opening cells opposite to the inner surface of the inlet opening cell, and then extends along the entire length of the inlet opening cell, wherein the surface layer has a tapered section where a film thickness gradually increases from a terminal end of the inlet peripheral region for a predetermined length, shorter than the entire length of the inlet opening cell, toward the outlet side of the inlet opening, and wherein, aside from the tapered region section, the surface layer has a constant thickness.

2. The honeycomb filter in accordance with claim 1, wherein a catalyst is supported on at least one of the porous partition walls and the surface layers.

3. The honeycomb filter in accordance with claim 1, wherein a catalyst is supported on at least one of the porous partition walls and the surface layers.

4. A manufacturing method of the honeycomb filter in accordance with claim 1, the manufacturing method comprising the steps of:
(a) producing a honeycomb structure having a large number of cells parted by porous partition walls, where the large number of cells include (i) inlet opening cells that extend along a length of the honeycomb filter and have open inlets on an inlet side of the honeycomb filter and closed outlets on an outlet side of the honeycomb filter that are sealed with outlet sealing members, and (ii) outlet opening cells that extend along the length of the honeycomb filter and have closed inlets on the inlet side of the honeycomb filter sealed with inlet sealing members and open outlets on the outlet side of the honeycomb filter, the inlet opening cells and the outlet opening cells are arranged alternately to be adjacent to each other;
(b) after the step (a), forming a protective film on an inner surface of each of the inlet opening cells in an inlet peripheral region that represents an area extended from the open inlet of the inlet opening cell to a specific depth corresponding to a length of the inlet sealing members of adjacent outlet opening cells;
(c) after the step (b), preparing a slurry as an aqueous dispersion of a material mixture for surface layers and applying the slurry onto the inner surface of each inlet opening cell; and
(d) after the step (c), removing the protective films from the honeycomb structure.

5. The manufacturing method in accordance with claim 4, wherein the step (b) forms the protective films from a pyrolytic organic substance, and the step (d) removes the protective films by heat treatment of the honeycomb structure at a pyrolysis temperature of the protective films.

* * * * *

UNITED STATES PATENT AND TRADEMARK OFFICE
CERTIFICATE OF CORRECTION

| | |
|---|---|
| PATENT NO. | : 8,343,431 B2 |
| APPLICATION NO. | : 12/719091 |
| DATED | : January 1, 2013 |
| INVENTOR(S) | : Shingo Tokuda and Takashi Mizutani |

It is certified that error appears in the above-identified patent and that said Letters Patent is hereby corrected as shown below:

Column 15, line 26

(Claim 1) Add --inlet-- before "opening cell"

Column 15, line 30

(Claim 1) Start "wherein" as a new paragraph

Column 15, line 35

(Claim 1) Add --cell-- after "inlet opening" and start "wherein" as a new paragraph Column 15, line 36

(Claim 1) Delete "region"

Signed and Sealed this
Nineteenth Day of March, 2013

Teresa Stanek Rea
*Acting Director of the United States Patent and Trademark Office*